(12) United States Patent  
Nakashima et al.

(10) Patent No.: US 7,629,712 B2  
(45) Date of Patent: Dec. 8, 2009

(54) ELECTRONIC APPARATUS HAVING DC VOLTAGE CONVERSION FUNCTION, AND DC VOLTAGE CONVERTER

(75) Inventors: Yoshiyasu Nakashima, Kawasaki (JP); Satoshi Kazama, Kawasaki (JP); Hideyuki Motoyama, Kawasaki (JP); Shinichi Yoshimoto, Kawasaki (JP); Koichi Yokota, Kawasaki (JP); Hiroshi Yamada, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 382 days.

(21) Appl. No.: 11/264,133

(22) Filed: Nov. 2, 2005

(65) Prior Publication Data

US 2007/0008663 A1    Jan. 11, 2007

(30) Foreign Application Priority Data

Jul. 8, 2005    (JP)    ............... 2005-200588

(51) Int. Cl.
*H02J 1/00*    (2006.01)
(52) U.S. Cl. ............... 307/126; 307/31; 307/39
(58) Field of Classification Search ......... 307/31, 307/32, 34, 39, 37, 38, 42, 126; 361/18; 713/320
See application file for complete search history.

(56) References Cited

U.S. PATENT DOCUMENTS 5,387,820 A * 2/1995 Imagawa ............ 307/31
5,994,795 A * 11/1999 Gabillet ............ 307/66

(Continued)

FOREIGN PATENT DOCUMENTS

EP    0 881 758 A2    12/1998

(Continued)

OTHER PUBLICATIONS

Maxim Integrated Products, Inc.; "DC-DC Converter Tutorial;" http://pdfserv.maxim-ic.com/en/an/AN710.pdf; Oct. 19, 2000; 11 Sheets/Discussed in the specification.

(Continued)

*Primary Examiner*—Albert W Paladini
*Assistant Examiner*—Daniel Cavallari
(74) *Attorney, Agent, or Firm*—Kratz, Quintos & Hanson, LLP

(57) ABSTRACT

A voltage conversion circuit is provided for efficiently converting the voltage of a DC power source into a lower voltage in accordance with load currents of voltage converters. An electronic apparatus includes: a DC power source for supplying a first DC supply voltage; a first DC voltage converter for converting the first DC supply voltage into a second DC supply voltage which is lower than the first DC supply voltage; a second DC voltage converter for converting either the first DC supply voltage or the second DC supply voltage at an input voltage terminal thereof into a third DC supply voltage which is lower than the second DC supply voltage; a switch for selecting and supplying one of the first DC supply voltage of the DC power source and the second DC supply voltage of the first DC voltage converter to the input voltage terminal of the second DC voltage converter, in accordance with a control signal; a switching controller for providing the control signal to the switch; and a plurality of components, ones of the components receiving the second DC supply voltage, ones of the components receiving the third DC supply voltage.

10 Claims, 9 Drawing Sheets

U.S. PATENT DOCUMENTS

| | | | |
|---|---|---|---|
| 6,067,241 A | 5/2000 | Lu | 363/65 |
| 6,225,708 B1 * | 5/2001 | Furukawa et al. | 307/66 |
| 7,043,648 B2 * | 5/2006 | Tokunaga | 713/320 |
| 7,177,131 B2 * | 2/2007 | Chen et al. | 361/93.9 |
| 7,225,086 B2 * | 5/2007 | Naitoh et al. | 702/57 |
| 7,269,447 B2 * | 9/2007 | Yamatani | 455/574 |
| 2003/0090236 A1 * | 5/2003 | Odaohhara et al. | 320/134 |
| 2003/0188210 A1 * | 10/2003 | Nakazato | 713/320 |
| 2004/0201279 A1 * | 10/2004 | Templeton | 307/11 |
| 2005/0162146 A1 * | 7/2005 | Kobayashi | 323/318 |
| 2005/0182991 A1 * | 8/2005 | Kawakubo | 714/54 |

FOREIGN PATENT DOCUMENTS

| | | |
|---|---|---|
| EP | 1 049 240 A1 | 11/2000 |
| JP | 59-85045 | 6/1984 |
| JP | 08162138 A * | 6/1996 |
| JP | 11-41825 | 2/1999 |
| JP | 11041825 A * | 2/1999 |

OTHER PUBLICATIONS

ON Semiconducter; "Understanding the Output Current Capability of DC-DC Buck Converters;" http://www.onsemi.com/pub/Collateral/AND8117-D.PDF; Apr. 2003—Rev. 3; pp. 1-5 and Information Sheet (6 Sheets total)/ Discussed in the specification.
European Search Report dated May 9, 2008.
Japanese Office Action dated May 26, 2009.

* cited by examiner

TABLE 1. ESTIMATED CONSUMED CURRENTS OF COMPONENTS RECEIVING SUPPLY VOLTAGE OF 3.3 V

|  | INACTIVE | IDLE | ACTIVE | MAX. CURRENT |
|---|---|---|---|---|
| WIRED LAN CARD | 30 mA | 60 mA | 560 mA | — |
| WIRELESS LAN CARD | 10 mA | 50 mA | 150 mA | 1 A |
| PC CARD CONTROLLER | 10 mA | 30 mA | 500 mA | 1.03 A |
| AUDIO DEVICE | 10 mA | 15 mA | 100 mA | 250 mA |
| ... | ... | ... | ... | ... |

FIG. 8A

TABLE 2. ESTIMATED CONSUMED CURRENTS OF COMPONENTS RECEIVING SUPPLY VOLTAGE OF 1.5 V

|  | IDLE | | | | |
|---|---|---|---|---|---|
| SLEEP RATIO | >98% | >90% | >70% | >50% | > 0% |
| CPU | 100 mA | 300 mA | 600 mA | 1 A | 2 A |
| ... | ... | ... | ... | ... | ... |

FIG. 8B

ELECTRONIC APPARATUS HAVING DC VOLTAGE CONVERSION FUNCTION, AND DC VOLTAGE CONVERTER

FIELD OF THE INVENTION

The present invention generally relates to an electronic apparatus having a DC voltage converter function, and in particular to an electronic apparatus including a DC voltage converter circuit for converting a DC source voltage into a plurality of DC supply voltages.

BACKGROUND OF THE INVENTION

In mobile notebook personal computers (PCs), there are needs for an improvement in the power supply efficiency for longer battery run time, and for reduction in the component mounting areas to reduce the sizes of printed circuit boards for reduction in size, weight and thickness of the PCs. However, the employed ICs of the PC, such as a CPU, a set of chips and a graphic chip, tend to use lower operation voltages to reduce their electric power consumptions, and require their respective different supply voltages. Hence the number of desired different supply voltages in the PC tends to increase.

Matsumura discloses in Japanese Patent Application Publication No. JP H 11-41825-A published on Feb. 12, 1999 describes a power supply switching device for switching power supplies depending on the load power consumption. This power supply switching device includes a battery to be incorporated into a portable device, and at least one or more constant voltage means. The power supply switching device further includes DC voltage converting means for generating a DC voltage lower than the battery voltage, switching means for switching between the battery voltage and the DC voltage generated by the DC voltage converting means to thereby supply the electric power to an input of the constant voltage means, and control means for controlling the switching means so that the power source should be switched to the DC voltage generated by the DC voltage converting means in a main driving state in which the power consumption is large, while the power source should be switched to the battery voltage in a standby state in which the power consumption is small.

A DC voltage conversion circuit which includes a plurality of DC-DC converters, each having a switching element, a diode, a capacitor and an inductor, is well known. DC-DC converters are disclosed by Maxim Integrated Products, Inc. in a document entitled "DC-DC Converter Tutorial", Oct. 19, 2000 on a Web page at http://pdfserv.maxim-ic.com/en/an/AN710.pdf, and by ON Semiconductor in a document entitled "Understanding the Output Current Capability of DC-DC Buck Converters", April, 2003-Rev.0 on a Web page at http://www. onsemi.com/pub/Collateral/AND8117-D.PDF, which are incorporated herein by reference.

SUMMARY OF THE INVENTION

In accordance with an aspect of the present invention, an electronic apparatus includes: a DC power source for supplying a first DC supply voltage; a first DC voltage converter for converting the first DC supply voltage into a second DC supply voltage which is lower than the first DC supply voltage; a second DC voltage converter for converting either the first DC supply voltage or the second DC supply voltage at an input voltage terminal thereof into a third DC supply voltage which is lower than the second DC supply voltage; a switch for selecting and supplying one of the first DC supply voltage of the DC power source and the second DC supply voltage of the first DC voltage converter to the input voltage terminal of the second DC voltage converter, in accordance with a control signal; a switching controller for providing the control signal to the switch; and a plurality of components, ones of the components receiving the second DC supply voltage, ones of the components receiving the third DC supply voltage.

The invention also relates to a voltage converter for use in the electronic apparatus described above.

BRIEF DESCRIPTION OF THE DRAWINGS

FIGS. 8A and 8B show examples of tables of the relations between the estimated consumed electric currents and the operational states of respective components receiving the nominal voltages.

DESCRIPTION OF THE PREFERRED EMBODIMENTS

When DC-DC converters (DDCs) in the number of supply voltages required in a PC are coupled in parallel to a DC source voltage, the total voltage conversion efficiency becomes low in general. In contrast, when DC-DC converters (DDCs) in the number of supply voltages required in a PC are coupled in series to a DC power supply voltage, the entire voltage conversion efficiency becomes high in general. In this case, however, the first stage DC-DC converter coupled in series for converting the DC source voltage requires a larger allowable current, so that the size of the first stage DC-DC converter increases. This is undesirable for reducing the size of a PC.

An object of the present invention is to provide a voltage conversion circuit for efficiently converting the voltage of a DC power source into a lower voltage in accordance with load currents of voltage converters.

Another object of the invention is to provide a voltage conversion circuit for efficiently converting a voltage of a DC power source into a lower voltage in accordance with actual or estimated load currents of voltage converters.

According to the invention, without an increase in the size of a voltage converter, a voltage conversion circuit is provided for efficiently converting the voltage of a DC power source into a lower voltage in accordance with the actual or estimated load currents of the voltage converters.

The invention will be described in connection with non-limiting embodiments with reference to the accompanying drawings. Throughout the drawings, similar symbols and numerals indicate similar items and functions.

Figure 1A:
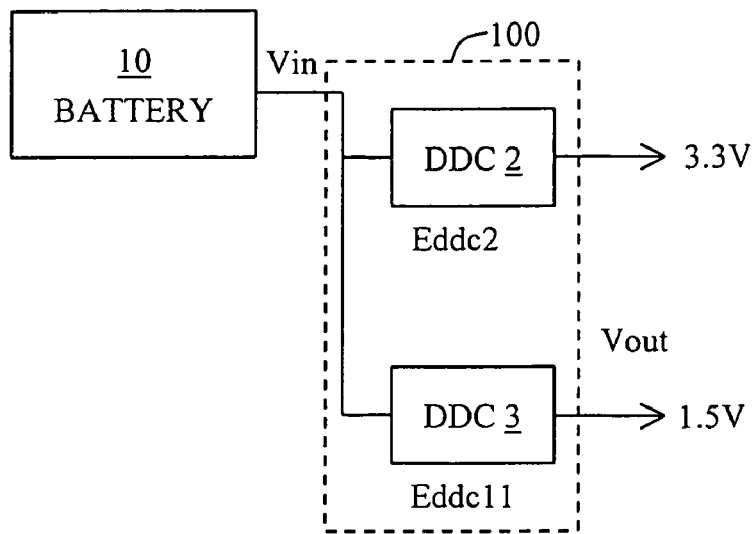
FIGS. 1A and 1B show the arrangements of prior art DC voltage conversion circuits, respectively, in each of which two DC-DC voltage converters (DDCs) employed in an electronic apparatus are coupled in fixed parallel connection or in fixed series connection.
Figure 1B:
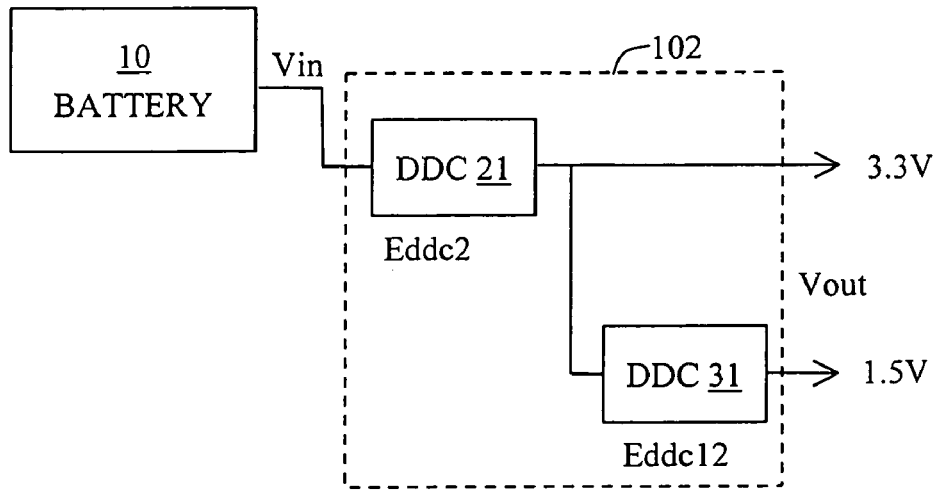

FIGS. 1A and 1B show the arrangements of prior art DC voltage conversion circuits 100 and 102, respectively, in each of which two DC-DC voltage converters (DDCs) employed in an electronic apparatus such as a notebook personal computer (PC) are coupled in fixed parallel connection or in fixed series connection. The prior art DC voltage conversion circuits 100 and 102 are provided with DC-DC voltage converters in the number of desired supply voltages. However, for simplicity of description, only two supply voltages of 3.3 V and 1.5 V are shown in these figures. In FIG. 1A, the DC-DC voltage converters 2 and 3 in parallel connection are coupled to a DC battery power source 10 of the electronic apparatus. In contrast, in FIG. 1B, the DC-DC voltage converters 21 and 31 in series connection are coupled to a DC battery power source 10 of the electronic apparatus. The voltage conversion efficiency of each of the DC-DC voltage converters 2 and 21 for converting the output voltage of the battery power source 10 of FIGS. 1A and 1B is denoted by Eddc2. Further, the voltage conversion efficiency of the DC-DC voltage converter 3 for converting the output voltage of the battery power source 10 of FIG. 1A is denoted by Eddc11, while the voltage conversion efficiency of the DC-DC voltage converter 31 for converting the output voltage of the DC-DC voltage converter 21 of FIG. 1B is denoted by Eddc12. Then, the voltage conversion efficiency of the DC voltage conversion circuit 102 is Eddc2×Eddc12 for the load current through the terminal for the supply voltage of 1.5 V of the DC-DC voltage converter 31 of FIG. 1B.

In the DC voltage conversion circuit 100 of FIG. 1A, the voltage difference is large between the high DC voltage of the battery power source 10 and the nominal voltage (e.g., 1.5 V or 2.5 V) of IC chips or devices in the electronic apparatus, and hence a large power loss arises in the voltage conversion. The voltage of the battery power source 10 varies, for example, in a voltage range of 9 to 12 V. In the DC voltage conversion circuit 102 of FIG. 1B, the DC-DC voltage converter 21 is required to admit an extra current flow therethrough corresponding to the load current of the DC-DC voltage converter 31, and hence is required to have a large allowable current. Thus, the size of the DC-DC voltage converter 21 is increased.

Figure 2:
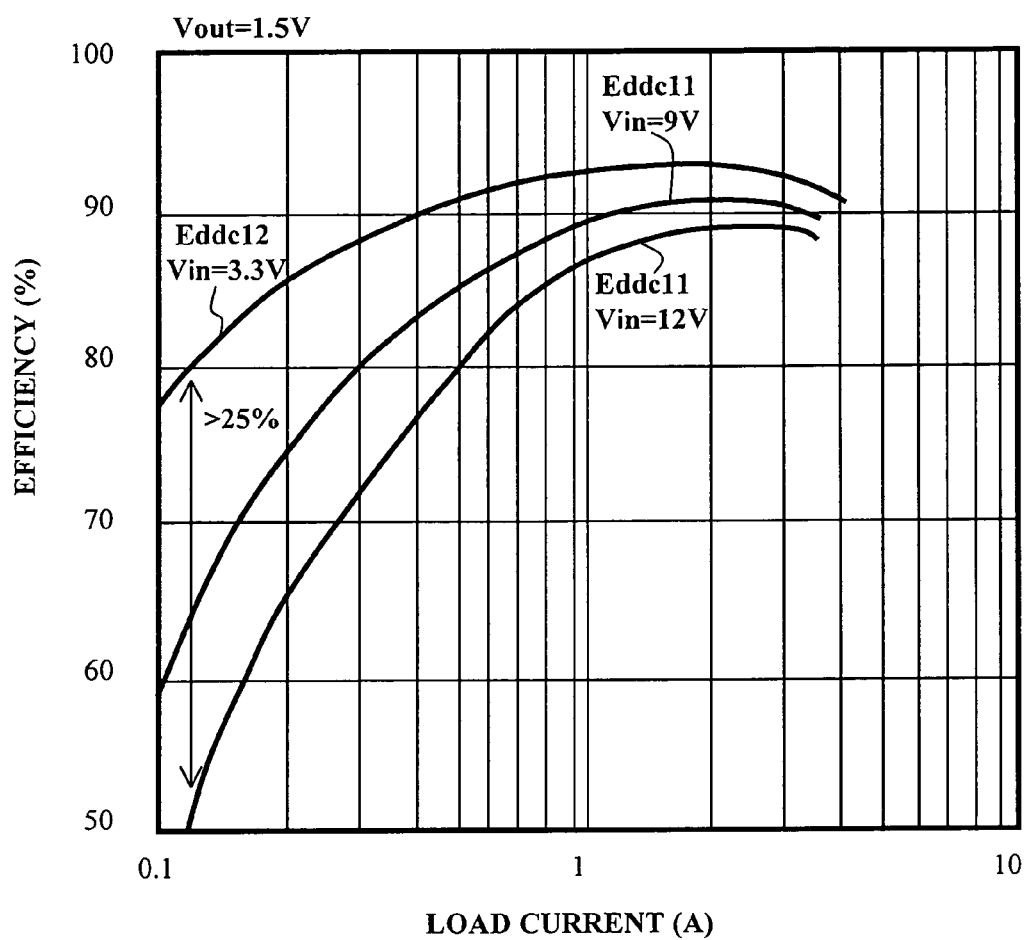
FIG. 2 shows the changes of the voltage conversion efficiencies as functions of load currents for conversion of the DC power supply voltage from the battery power source into a desired low supply voltage by the DC-DC voltage converter, and for conversion of the intermediate supply voltage from the DC-DC voltage converter coupled to the battery power source into the desired low supply voltage by the other DC-DC voltage converter, respectively.

FIG. 2 shows the changes of the voltage conversion efficiencies as functions of the load currents for conversion of the DC power supply voltage from the battery power source 10 into a desired low supply voltage by the DC-DC voltage converter 3, and for conversion of the intermediate supply voltage from the DC-DC voltage converter 21 coupled to the battery power source 10 into the desired low supply voltage by the other DC-DC voltage converter 31, respectively. In this case, the input voltage Vin of the DC-DC voltage converter 3 has, for example, the lower voltage limit of 9 V and the upper voltage limit of 12 V of the battery power source 10, while the input voltage Vin of the DC-DC voltage converter 31 is the output supply voltage of 3.3 V of the DC-DC voltage converter 21. The desired low supply voltage Vout of the DC-DC voltage converter 3 or 31 is 1.5 V. As can be seen from FIG. 2, the way of converting the high battery power source voltage of 9 V or 12 V into the low supply voltage of 1.5 V by the single DC-DC voltage converter 3 of FIG. 1A exhibits a lower voltage conversion efficiency than the way of converting the intermediate supply voltage of 3.3 V of the DC-DC voltage converter 21 into the low supply voltage of 1.5 V by the DC-DC voltage converter 31 of FIG. 1B. In general, a larger difference between the voltage to be converted and the resultant converted voltage results in lower voltage conversion efficiency. However, the DC-DC voltage converter 21 of FIG. 1B has the allowable current which is increased by the amount of a current supplied to the DC-DC voltage converter 31, and has components, such as a coil, which have larger sizes or larger heights than those of the DC-DC voltage converter 2 of FIG. 1A. Accordingly, the DC-DC voltage converter 21 of FIG. 1B is not applicable to electronic apparatuses having thin bodies, such as notebook PCs.

The inventors have recognized that the conversion efficiency of the voltage of the DC battery power source 10 into the nominal voltages of respective components is required to be enhanced without increasing the heights or the sizes of the components incorporated into the electronic apparatus. Further, the inventors have recognized from FIG. 2 that the size of the DC-DC voltage converter 21 can be reduced, by generating the voltage of 1.5 V from the voltage of 3.3 V for the small load current, and by generating the voltage of 1.5 V from the battery power source voltage of 9 to 12 V for the large load current.

Figure 3:
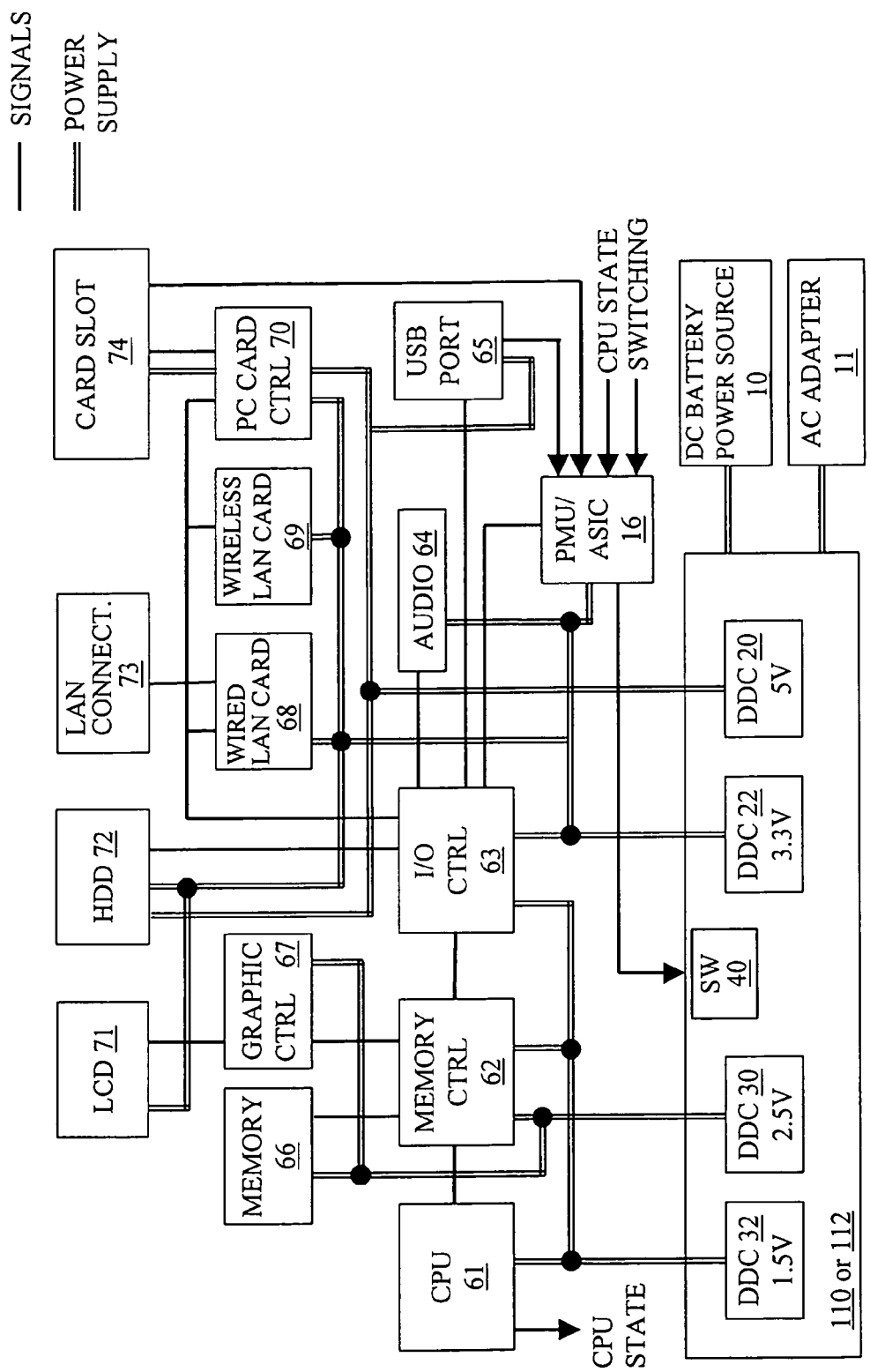
FIG. 3 shows the configuration of an electronic apparatus including a DC voltage conversion circuit, in accordance with an embodiment of the invention.

FIG. 3 shows the configuration of an electronic apparatus, such as a notebook PC, including a DC voltage conversion circuit 110 or 112, in accordance with an embodiment of the invention. The electronic apparatus of FIG. 3 includes a DC battery power source 10, an AC power supply adapter 11 for supplying a DC voltage, a PMU/ASIC 16, and a DC voltage conversion circuit 110 or 112. The electronic apparatus also includes other components, for example, a CPU 61, a memory control unit 62, an I/O control unit 63, an audio device 64, a USB port 65, a memory 66, a graphic control unit 67, a wired LAN card 68, a wireless LAN card 69, a PC card control unit 70, an LCD 71, an HDD 72, a LAN connection unit (CN) 73 and a card slot 74. The PMU/ASIC 16 has a power supply microcomputer function. In this case, the DC voltage conversion circuit 110 or 112 includes DC-DC voltage converters (DDCs) 20, 22, 30 and 32 for outputting respective supply voltages Vout's of 5 V, 3.3 V, 2.5 V and 1.5 V. Each of the DC-DC voltage converters 20, 22, 30 and 32 has a well known configuration, and includes a switching element, a smoothing capacitor and an inductor. The PMU/ASIC 16 has the function of managing the charging, discharging and the like of the battery and the function of keyboard control (the keyboard connection is not shown).

The embodiments of the invention are described herein in connection with the battery power source 10 employed as the DC power source. However, the invention is also applicable to a DC voltage conversion circuit with the AC power source adapter 11 employed as the DC power source.

In FIG. 3, the DC-DC voltage converter 20 provides the supply voltage of 5 V to the PC card control unit 70 and the HDD 72. The DC-DC voltage converter 22 provides the supply voltage of 3.3 V to the PMU/ASIC 16, the I/O control unit 63, the audio device 64, the wired LAN card 68, the wireless LAN card 69, the PC card control unit 70, the LCD 71, the HDD 72 and the card slot 74. The DC-DC voltage converter 30 provides the supply voltage of 2.5 V to the memory control unit 62, the memory 66 and the graphic control unit 67. The DC-DC voltage converter 32 provides the supply voltage of 1.5 V to the CPU 61, the memory control unit 62 and the I/O control unit 63.

Figure 4:
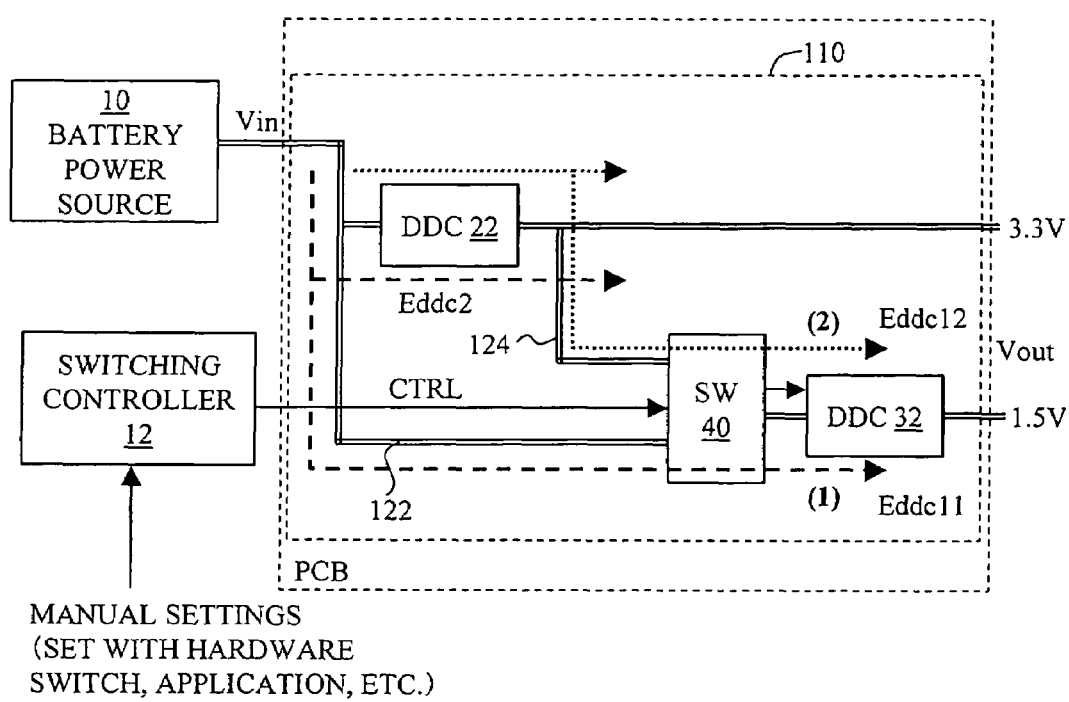
FIG. 4 shows the configuration of a DC voltage conversion circuit and a switching controller, in accordance with an embodiment of the invention.

FIG. 4 shows the configuration of a DC voltage conversion circuit 110 and a switching controller 12, in accordance with an embodiment of the invention.

In FIG. 4, the DC voltage conversion circuit 110 includes a DC-DC voltage converter 22 connected to the output terminal of the battery power source 10 for providing a supply voltage Vout of 3.3 V, and a DC-DC voltage converter 32 selectively connected to the output terminals of the battery power source 10 and the DC-DC voltage converter 22 via a switch (SW) 40 for providing a supply voltage Vout of 1.5 V. The operating condition of the switching controller 12 is set up manually by a user through a hardware circuit switch or an application. The switching controller 12 receives a setting signal from the hardware circuit switch, the application or the like, to thereby provide a control signal CTRL to the switch 40. The switching controller 12 may be the function of the PMU/ASIC 16 of FIG. 3.

The output terminal of the DC supply voltage 9 to 12 V of the battery power source 10 and the output terminal of the DC supply voltage 3.3 V of the DC-DC voltage converter 22 are connected to the respective input terminals of the switch 40 via the respective conductors 122 and 124. The DC voltage conversion circuit 110 and the switching controller 12 are mounted typically on a single printed circuit board PCB. The conductors 122 and 124 may be formed by foil conductors of the printed circuit board. Alternatively, at least one of the conductors 122 and 124 may be formed by a separate electrically conductive wire which is different from the conductor of the printed circuit board. This facilitates the design of the arrangement of circuits on the printed circuit board, even if a high density of the circuit elements on the printed circuit board and the limited number of layers of the printed circuit board (e.g., a six-layered board) inhibit the formation of a low impedance conductor foil pattern having sufficient area and width for the power supply on the printed circuit board.

In response to a control signal CTRL from the switching controller 12, the switch 40 selects either the power supply voltage terminal (e.g., 12 V) of the battery power source 10 or the supply voltage terminal (e.g., 3.3 V) of the DC-DC voltage converter 22 to connect to the input voltage terminal of the DC-DC voltage converter 32. The DC-DC voltage converter 32 controls its switching operation in accordance with the input voltage to regulate the input voltage to provide the predetermined supply voltage of 1.5 V as the output. The operating condition of the switching controller 12 is set up manually through the hardware switch (not shown) or the application (the function of the CPU 61 that operates in accordance with the application stored in the memory 66) such that, when the operational states of the components of the electronic apparatus correspond to a state that the load current of the supply voltage terminal of the DC-DC voltage converter 32 is estimated not to exceed a predetermined threshold current (e.g., 0.5 A), the input voltage terminal of the DC-DC voltage converter 32 should be switched and connected to the output voltage terminal (3.3 V) of the DC-DC voltage converter 22, while, when the operational states of the components of the electronic apparatus correspond to a state that the load current of the supply voltage terminal of the DC-DC voltage converter 32 is estimated to exceed the predetermined threshold current (e.g., 0.5 A), the input voltage terminal of the DC-DC voltage converter 32 should be switched and connected to the power supply voltage terminal (9 V or 12 V) of the battery power source 10.

In a simple way, for example, an operation monitoring application that is implemented on the CPU 61 or the like may monitor the operational states of the components of the electronic apparatus, and then provide to the switching controller 12 a conditional signal corresponding to the operational state, so that, in response to the conditional signal, the switching controller 12 provides the control signal CTRL to the switch 40. In this case, for example, if the electronic apparatus is in an inactive state, or a predetermined low-loading application of the electronic apparatus is in an active state or in a predetermined operation state (e.g., not using the PC card), in which the electronic apparatus is in such a state that the load current level at the supply voltage terminal of the DC-DC voltage converter 32 is estimated not to exceed a predetermined threshold current (e.g., 0.5 A), then the switching controller 12 may receive a conditional signal indicating the estimated low loading state of the DC-DC voltage converter 32 from the operation monitoring application, and then provide to the switch 40 a control signal CTRL for switching and connecting the input voltage terminal of the DC-DC voltage converter 32 to the output voltage terminal of the DC-DC voltage converter 22. On the other hand, if a predetermined high-loading application is in an active state or in other predetermined operation states (e.g., using a PC card), in which the electronic apparatus is in such a state that the load current level at the supply voltage terminal of the DC-DC voltage converter 32 is estimated to exceed the predetermined threshold current, then the switching controller 12 may receive another conditional signal indicating the estimated high loading state of the DC-DC voltage converter 32 from the operation monitoring application, and then provide to the switch 40 a control signal CTRL for switching and connecting the input voltage terminal of the DC-DC voltage converter 32 to the power supply voltage terminal of the battery power source 10.

As a further example, the operational states of the components of the electronic apparatus are monitored similarly. If the electronic apparatus is in an inactive state and applications of the electronic apparatus except for the operation monitoring application are in inactive states, in which the load current level of the DC-DC voltage converter 32 is low as described above, the switching controller 12 may receive a conditional signal indicating these states from the operation monitoring application, and then provide to the switch 40 a control signal CTRL for switching and connecting the input voltage terminal of the DC-DC voltage converter 32 to the output voltage terminal of the DC-DC voltage converter 22. On the other hand, if any of the applications is in an active state as activated by the user, in which the load current level of the DC-DC voltage converter 32 is high as described above, then the switching controller 12 may receive a conditional signal indicating this state from the operation monitoring application, and then provide to the switch 40 a control signal CTRL for switching and connecting the input voltage terminal of the DC-DC voltage converter 32 to the power supply voltage terminal of the battery power source 10. In this case, for detecting the activation of the application, a conditional signal indicating the activation may be provided to the switching controller 12 in response to operation of a key or a hardware switch or alternatively a software switch or an icon on a display screen by a user who activates the application. Alternatively, a hardware switch may be provided in the housing of the electronic apparatus so that, for activating the application, the user is allowed to operate the switch, to thereby provide a conditional signal indicating the activation to the switching controller 12.

Figure 5:
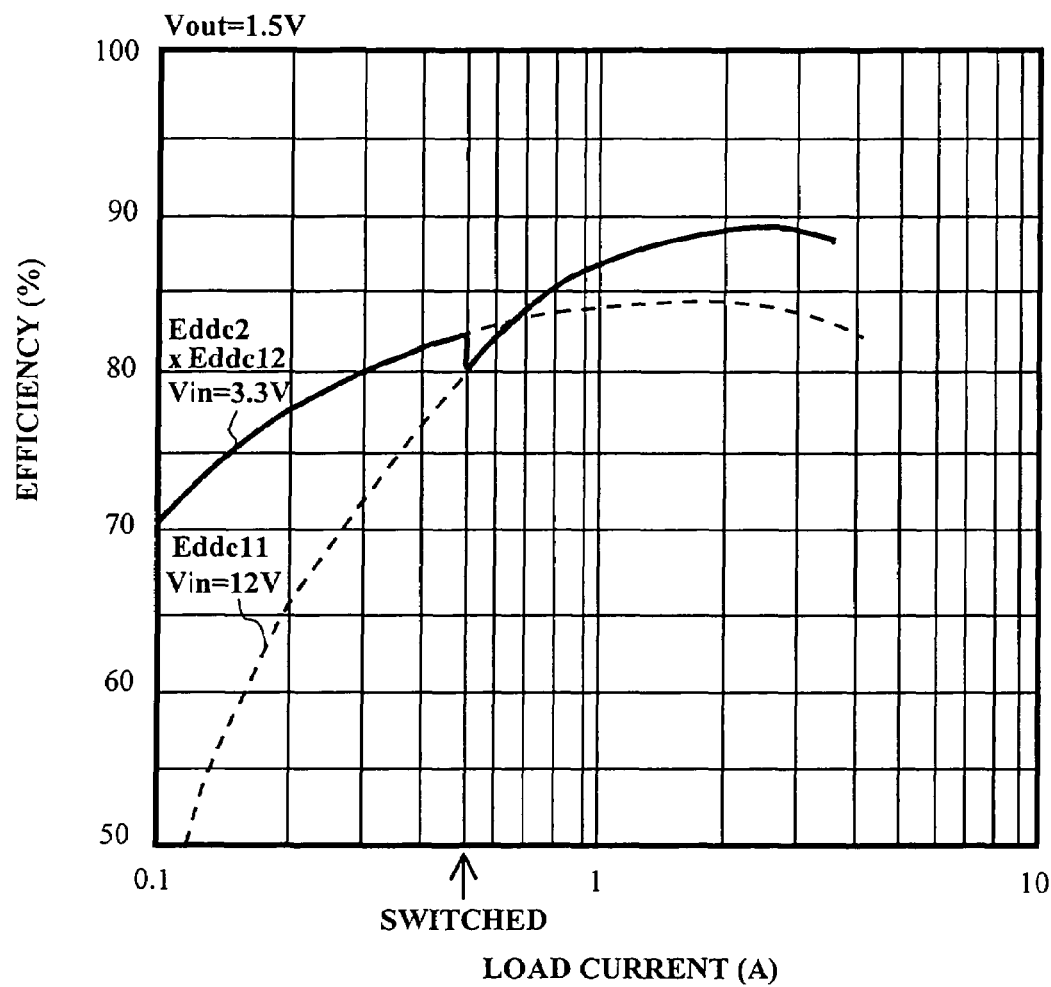
FIG. 5 shows the change of the voltage conversion efficiency of the DC voltage conversion circuit as a function of the load current of the supply voltage terminal of the DC-DC voltage converter in which the switch operates in response to the switching control signal CTRL from the switching controller.

FIG. 5 shows the change of the voltage conversion efficiency of the DC voltage conversion circuit 110 as a function of the load current through the supply voltage terminal (1.5 V) of the DC-DC voltage converter 32, in which the switch 40 operates in response to the switching control signal CTRL from the switching controller 12. When the load current of the DC-DC voltage converter 32 is at 0.5 A or lower, the DC-DC voltage converter 32 converts the supply voltage of 3.3 V of the DC-DC voltage converter 22 into 1.5 V, where the voltage conversion efficiency Eddc2 is approximated as 90% which is near the maximum efficiency in FIG. 2. Thus, the voltage conversion efficiency Eddc2×Eddc12 is about 75% to 85%. On the other hand, when the load current of the DC-DC voltage converter 32 is higher than 0.5 A, the DC-DC voltage converter 32 converts the output voltage 12 V of the battery power source 10 into 1.5 V. Thus, the voltage conversion efficiency Eddc11 is about 80% to 90%. The load current described here is an estimated value. Thus, in order to prevent an excessive current from actually flowing through the DC-DC voltage converter 32, the predetermined threshold current should be set somewhat lower, for example, by the amount corresponding to 3% of the efficiency, than the point at the intersection between the curves of the voltage conversion efficiencies Eddc2×Eddc12 and Eddc11. Thus, the DC-DC voltage converter 22 is not involved in the voltage conversion for a load current higher than the predetermined threshold current of 0.5 A, and hence does not require an increase in size.

Figure 6:
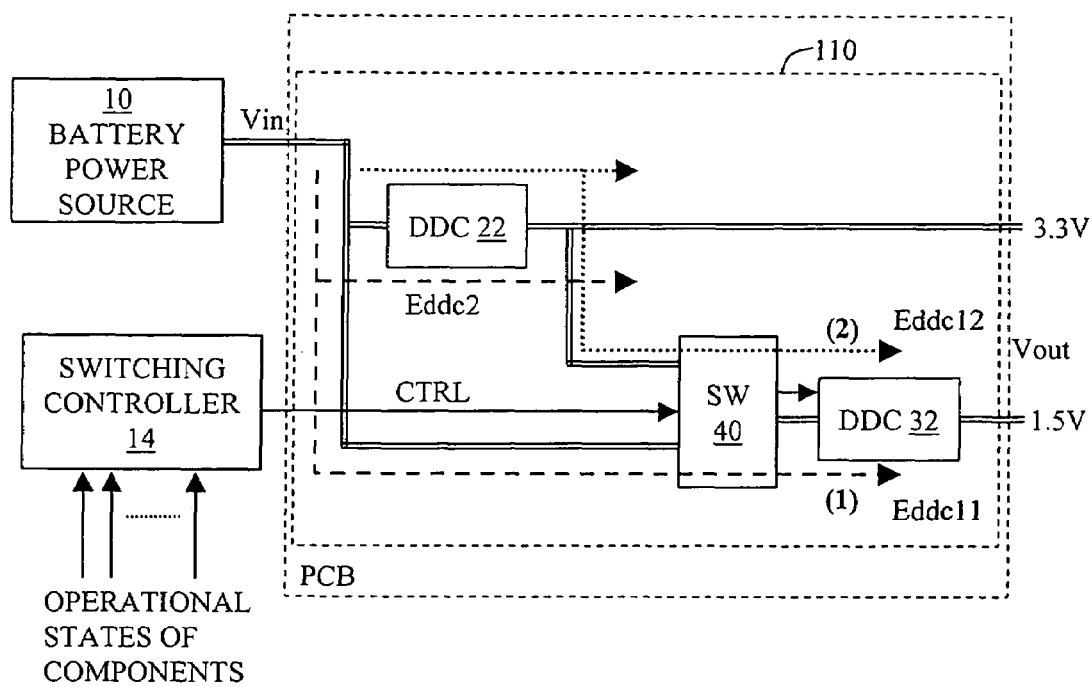
FIG. 6 shows a modification of the configuration of FIG. 4, and shows the configuration of a DC voltage conversion circuit and a switching controller in accordance with another embodiment of the invention.

FIG. 6 shows a modification of the configuration of FIG. 4, and shows the configuration of a DC voltage conversion circuit 110 and a switching controller 14 in accordance with another embodiment of the invention. In this case, the switching controller 14 receives signals indicating the respective operational states of the components of the system of the electronic apparatus of FIG. 3, and then processes the signals to provide a control signal CTRL to the switch 40.

Figure 7:
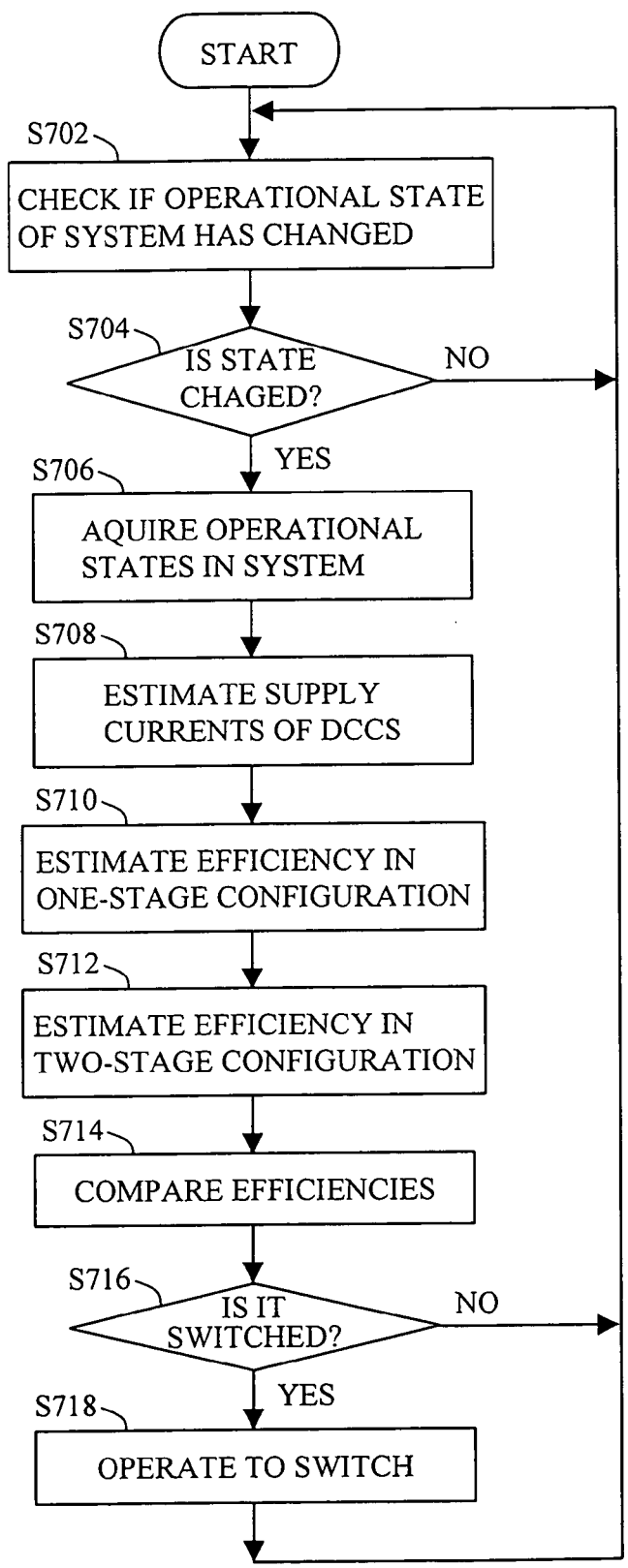
FIG. 7 is a flow chart for determining the control signal CTRL provided to the switch, which is performed by the switching controller.

FIG. 7 is a flow chart for determining the control signal CTRL provided to the switch 40, which is performed by the switching controller 14.

Tables that approximate the graph or curves of FIG. 2 and are used by the switching controller 14 are prestored, for example, in a flash memory of the PMU 16. These tables include a table (not shown) representing the approximated voltage conversion efficiencies of the DC-DC voltage converter 22 for a plurality of load current values for the output voltage of 9 to 12 V (e.g., 10 V) of the battery power source 10 as the input voltage, and a table (not shown) representing the approximated voltage conversion efficiencies of the DC-DC voltage converter 32 for a plurality of selected load current values for the output voltage of 9 to 12 V (e.g., 10 V) of the battery power source 10 and the supply voltage of 3.3 V of the DC-DC voltage converter 22 as the input voltages. Further, a further table is also prestored, for example, in the flash memory of the PMU 16. This table represents the relation of the consumed electric current values with the operational states, i.e., an inactive state, an idle state, an active state, and a maximum current state or the sleep ratio of the components such as the CPU 61, the I/O devices (e.g., the PC card control unit 70, the wired LAN card 68, and the wireless LAN card 69) and the audio device 64. In accordance with these tables, the switching controller 14 determines the value of the estimated consumed electric current of each component corresponding to the operational state of that component.

FIGS. 8A and 8B show examples of Tables 1 and 2 of the relation between the estimated consumed electric currents and the operational states of respective components receiving the nominal voltages of 3.3 V and 1.5 V. Table 1 represents the consumed electric currents in respective operational states of the wired LAN card 68, the wireless LAN card 69, the PC card control unit 70 and the audio device 64, which receive the nominal voltage of 3.3 V. Table 2 represents the consumed electric currents in respective operational states of the CPU 61 receiving the nominal voltage of 1.5 V.

With reference to FIG. 7, at Step 702, the switching controller 14 polls the CPU 61 periodically, and detects the presence or absence of a change in the system operational state, such as the CPU operational state and the I/O device connection state (e.g., of the PC card control unit 70). At Step 704, the switching controller 14 determines whether there has been a change in the system operational state. If it is determined that there is no change, the procedure returns to Step 702.

If it is determined that there has been such a change, the switching controller 14 at Step 706 interrupts the CPU 61, and acquires information indicating the operational states of the components of the system of the electronic apparatus. More specifically, the switching controller 14 collects the information on the operational states of the CPU 61, the I/O devices (e.g., the PC card control unit 70 and the LAN cards 68 and 69), the audio device 64, and the like, by inquiring the devices and the PMU/ASIC 16 as a power supply microcomputer. The operational state is any one of an inactive state, an idle state, an active state and a maximum current state of each device, or is the ratio of sleep duration of the CPU.

At Step 708, in accordance with the acquired operational states of the components, the switching controller 14 estimates the supply current of the DC-DC voltage converters 22 and 32 in accordance with the tables of the consumed electric currents in the respective operational states of components as shown in FIGS. 8A and 8B. In this estimation, for example, the value of the difference between the electric current value in the idle state and the electric current value in the current operational state for a particular component may be acquired, and then be added to or subtracted from the electric current value in the idle state. In this way, the current or present electric currents of all related devices are estimated.

For example, in Table 1 of FIG. 8A, the consumed electric current in the idle state of the wired LAN card 68 that receives the supply voltage of 3.3 V of the DC-DC voltage converter 22 is estimated to be 30 mA, and the consumed electric current of the PC card 74 in the idle state is estimated to be 30 mA. It is assumed that the estimated value of the sum of the hypothetical consumed electric currents in the idle states of all the components that receive the supply voltage of 3.3 V of the DC-DC voltage converter 22 is, for example, 1 A. On the other hand, it is assumed that the current operational state of the wired LAN card 68 is an active state of receiving an estimated current of 560 mA, the current operational state of the PC card 74 is a maximum current state of receiving a current of 1.03 A, and the current operational states of the other components that receive the supply voltage of 3.3 V are an idle state. In this case, with reference to Table 1 of FIG. 8A, the estimated value of the sum of the consumed electric currents in the current states of all the components that receive the supply voltage of 3.3 V is 1 A (in idle states of all the components)+0.5 A (the difference of the current of the wired LAN card)+1 A (the difference of the current of the PC card)=2.5 A.

For example, in Table 2 of FIG. 8B, in the idle state of the CPU 61 that receives the supply voltage of 1.5 V of the DC-DC voltage converter 32, the ratio of sleep duration is larger than 98%, and hence the estimated consumed electric current is 100 mA. In the sleep duration of the CPU 61, the CPU clock stops, and the CPU also stops its operation. When the ratio of sleep duration in the CPU 61 is greater than 90% and not greater than 98%, the estimated consumed electric current is 300 mA. When the ratio of sleep duration is greater than 70% and not greater than 90%, the estimated consumed electric current is 600 mA. When the ratio of sleep duration is greater than 50% and not greater than 70%, the estimated consumed electric current is 1 A. When the ratio of sleep duration is greater than 0% and not greater than 50%, the estimated consumed electric current is 2 A.

When the CPU 61 is the only component that receives the supply voltage of 1.5 V of the DC-DC voltage converter 32 and the current operational state of the CPU 61 is the state of 80% of sleep duration, the estimated consumed electric current of the CPU 61 is determined to be 600 mA in accordance with Table 2 of FIG. 8B.

At Step 710, in accordance with the tables that approximate the graph of FIG. 2 and the like and with the estimated consumed electric current of the component, the switching controller 14 estimates the voltage conversion efficiencies Eddc11 and the like of the DC-DC voltage converters 22 and 32 in a single stage configuration for the voltage (e.g., 10 V) of the battery power source 10.

As a first example, it is assumed that the total consumed electric current in the idle state of all the components that receive the supply voltage of 3.3 V of the DC-DC voltage converter 22 is 1 A, and that the voltage conversion efficiency Eddc2 of the DC-DC voltage converter 22 for the total consumed electric current is about 90% in accordance with a table (not shown) representing voltage conversion efficiencies for the load currents. If the total consumed electric current in the idle state of all the components that receive the supply voltage of 1.5 V of the DC-DC voltage converter 32 is 100 mA, then the voltage conversion efficiency Eddc11 of the DC-DC voltage converter 32 for the total consumed electric current is approximated as 50% in accordance with the table (not shown) that approximates the graph of FIG. 2.

As a second example, it is assumed that the total consumed electric current in the operational states of all the components that receive the supply voltage of 3.3 V of the DC-DC voltage converter 22 is 2.5 A, and that the voltage conversion efficiency of the DC-DC voltage converter 22 for the total consumed electric current is about 91% in accordance with the table (not shown) representing a voltage conversion efficiency for load currents. If the total consumed electric current in the operational states of all the components that receive the supply voltage of 1.5 V of the DC-DC voltage converter 32 is 600 mA, then the voltage conversion efficiency Eddc11 of the DC-DC voltage converter 32 at the consumed electric current is approximated as 85% in accordance with the table (not shown) that approximates the graph of FIG. 2.

At Step 712, in accordance with the two total estimated consumed electric currents of the respective groups of components that receive the respective supply voltages of 3.3 V and of 1.5 V, the switching controller 14 estimates the voltage conversion efficiency Eddc12 of the DC-DC voltage converter 32 in the two-stage configuration that receives as the input voltage the supply voltage of 3.3 V of the DC-DC voltage converter 22. It may be assumed that the voltage conversion efficiency Eddc2 of the DC-DC voltage converter 22 in the two-stage configuration is approximately equal to the efficiency in the single stage configuration.

In the first example described above, with reference to the graph of FIG. 2, for the supply voltage of 3.3 V of the DC-DC voltage converter 22 used as the input, the voltage conversion efficiency Eddc12 of the DC-DC voltage converter 32 is about 78% for the load current of 0.1 A in the idle states of all the components that receive the supply voltage of 1.5 V of the DC-DC voltage converter 32. Thus, the product of the voltage conversion efficiencies of the DC-DC voltage converters 22 and 32 in the two-stage configuration is Eddc2× Eddc12=about 90%×about 78%=about 70% for the load current of 0.1 A.

In the second example described above, with reference to the graph of FIG. 2, for the supply voltage of 3.3 V of the DC-DC voltage converter 22 used as the input, the voltage conversion efficiency Eddc12 of the DC-DC voltage converter 32 is about 92% for the load current of 600 mA in the operational states of all the components that receive the supply voltage of 1.5 V of the DC-DC voltage converter 32. Thus, the product of the voltage conversion efficiencies of the DC-DC voltage converters 22 and 32 in the two-stage configuration is Eddc2×Eddc12=about 91%×about 92%=about 83.7% for the load current of 600 mA.

At Step 714, the switching controller 14 compares the product Eddc2×Eddc12 of the voltage conversion efficiencies of the DC-DC voltage converters 22 and 32 with the conversion efficiency Eddc11 of the DC-DC voltage converter 32 alone, to thereby determine that the configuration for connection having the higher voltage conversion efficiency should be selected. If it is determined that the product Eddc2×Eddc12 of the conversion efficiencies is higher than the single conversion efficiency Eddc11, the two-stage configuration should be selected to provide the supply voltage of the DC-DC voltage converter 22 to the input of the DC-DC voltage converter 32. In contrast, if it is determined that the product Eddc2×Eddc12 of the conversion efficiencies is not higher than the single conversion efficiency Eddc11, the single stage configuration should be selected to provide the supply voltage of the battery power source 10 to the input of the DC-DC voltage converter 32.

In the first example described above, the product Eddc2× Eddc12 of the voltage conversion efficiencies of the DC-DC voltage converters 22 and 32 in the two-stage configuration is about 70%, while the single conversion efficiency Eddc11 of the DC-DC voltage converter 32 in the single stage configuration is about 50%. Thus, in this case, the two-stage configuration is advantageous in the voltage conversion efficiency.

In contrast, in the second example described above, the product Eddc2×Eddc12 of the voltage conversion efficiencies of the DC-DC voltage converters 22 and 32 in the two-stage configuration is about 83.7%, while the single conversion efficiency Eddc11 of the DC-DC voltage converter 32 in the single stage configuration is about 85%. Thus, in this case, the single stage configuration is advantageous in the voltage conversion efficiency.

At Step 716, the switching controller 14 compares the current position of the switch 40 with the position of the switch 40 to be selected for achieving the above-mentioned configuration for the higher efficiency, to determine whether the switch 40 should operate to change its position. If it is determined that the operation for changing its position is required, the switching controller 14 at Step 718 switches the switch 40 to change the current position to the desired position. If it is determined that the operation for changing its position is not required, the procedure returns to Step 702. The load current in this case is an estimated value, and hence, in order to prevent an excessive current from actually flowing through the DC-DC voltage converter 32, it may be arranged so that the two-stage configuration is selected only if the product Eddc2×Eddc12 of the voltage conversion efficiencies of the DC-DC voltage converters 22 and 32 in the two-stage configuration is higher, for example, by 3% or more, than the single conversion efficiency Eddc11 of the DC-DC voltage converter 32 in the single stage configuration, while otherwise the single stage configuration is selected.

Figure 9:
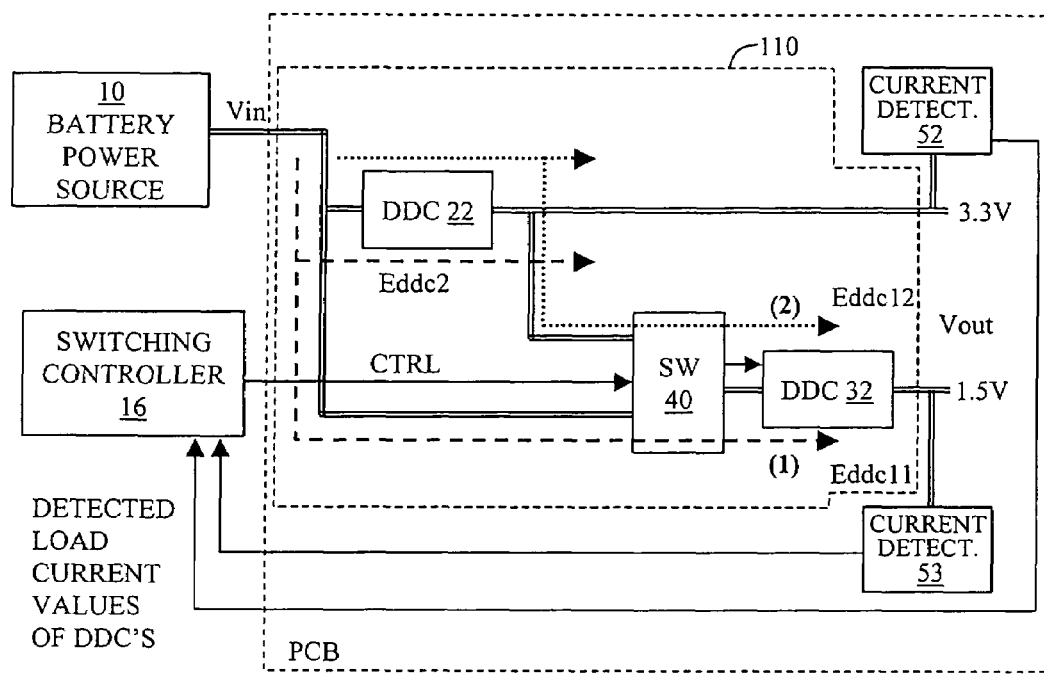
FIG. 9 shows the configuration of a DC voltage conversion circuit and a switching controller, in accordance with a further embodiment of the invention.

FIG. 9 shows the configuration of a DC voltage conversion circuit 110 and a switching controller 16 in place of the switching controller 12 or 14 of FIG. 4 or 6, in accordance with a further embodiment of the invention.

In FIG. 9, a current detector 52 is provided for detecting a component load current through the terminal of the supply voltage of 3.3 V of the DC-DC voltage converter 22, and another current detector 53 is provided for detecting a component load current through the terminal of the supply voltage of 1.5 V of the DC-DC voltage converter 32. The current detection values of the current detectors 52 and 53 are provided to the inputs of the switching controller 16. In this case, in contrast to the switching controller 12 of FIG. 4 which operates in accordance with the estimated load current, the switching controller 16 generates a switching control signal CTRL in accordance with the detected load current of the DC-DC voltage converter 32 and in accordance with the table (not shown) that approximates the graph of FIG. 2 or 5 representing the voltage conversion efficiencies for the load current values. Alternatively, in contrast to the switching controller 14 of FIG. 6 which operates in accordance with the estimated load current of the components obtained from the tables of FIGS. 8A and 8B, the switching controller 16 may determine the respective voltage conversion efficiencies for the comparison, as described above, in accordance with the load current values of the DC-DC voltage converters 22 and 32 detected by the current detectors 52 and 53, and in accordance with the tables (not shown) representing voltage conversion efficiencies for the detected load current values, to thereby generate a control signal CTRL.

According to the embodiments described above, the voltage of the DC battery power source 10 can be converted efficiently into the supply voltages of 3.3 V and 1.5 V in accordance with the estimated or detected load currents of the DC-DC voltage converters 22 and 32, without an increase in the size of the voltage converter.

The embodiments have been described only for the DC-DC voltage converters 22 and 32 in a single stage configuration or in a two-stage configuration. However, it should be understood that the invention is applicable also to the switching control of a switch for selection for connection in a three- or more-stage configuration including the DC-DC voltage converters 20 and 30 and other converters as shown in FIG. 3. This increases the number of combinations of the voltage converters and the number of the voltage conversion efficiencies of the voltage converters and the combinations to be compared.

The above-described embodiments are only typical examples, and their combination, modifications and variations are apparent to those skilled in the art. It should be noted that those skilled in the art can make various modifications to the above-described embodiments without departing from the principle of the invention and the accompanying claims.

What is claimed is:

1. An electronic apparatus comprising:
   a DC power source for supplying a first DC supply voltage;
   a first DC voltage converter for converting the first DC supply voltage into a second DC supply voltage which is lower than the first DC supply voltage;
   a second DC voltage converter for converting either the first DC supply voltage or the second DC supply voltage at an input voltage terminal thereof into a third DC supply voltage which is lower than the second DC supply voltage;
   a switch for selecting and supplying one of the first DC supply voltage of said DC power source and the second DC supply voltage of said first DC voltage converter to the input voltage terminal of said second DC voltage converter, in accordance with a control signal;
   a switching controller for providing to said switch said control signal for supplying said first DC supply voltage to said input voltage terminal of said second DC voltage converter when operation stages of the components receiving the third DC supply voltage correspond substantially to a high loading state, and for providing to said switch and control signal for supplying said second DC supply voltage to said input voltage terminal of said second DC voltage converter when operational states of the components receiving the third DC supply voltage correspond substantially to a low loading state; and
   a plurality of components, ones of said components receiving the second DC supply voltage, ones of said components receiving the third DC supply voltage.

2. An electronic apparatus according to claim 1, wherein said switching controller provides as the control signal a control signal for controlling said switch to supply the first DC supply voltage to said input voltage terminal of said second DC voltage converter when the operational states of the components receiving the third DC supply voltage correspond substantially to a state that a load current of said second DC voltage converter is estimated to be larger than a predetermined threshold, and controlling said switch to supply the second DC supply voltage to the input voltage terminal of said second DC voltage converter when the operational states of the components receiving the third DC supply voltage correspond substantially to a state that the load current of said second DC voltage converter is estimated to be not larger than the predetermined threshold.

3. An electronic apparatus according to claim 1, wherein, when a first estimated voltage conversion efficiency for converting the first DC supply voltage into the second DC supply voltage and then converting the second DC supply voltage into the third DC supply voltage for supplying a load current of said second DC voltage converter is higher, by a predetermined value or more, than a second estimated voltage conversion efficiency for converting the first DC supply voltage directly into the third DC supply voltage for supplying the load current of said second DC voltage converter, the control signal controls said switch to supply the second DC supply voltage to said input voltage terminal of said second DC voltage converter.

4. An electronic apparatus according to claim 1, wherein said switching controller detects operational states of one or more particular components of said electronic apparatus receiving the third DC supply voltage of said second DC voltage converter, and then determines, in accordance with an estimated consumed electric current of the particular components corresponding to the operational state of said specific component, a first estimated voltage conversion efficiency of said second DC voltage converter for converting the first DC supply voltage directly into the third DC supply voltage and a second estimated voltage conversion efficiency of said first and second DC voltage converters for converting the first DC supply voltage into the second DC supply voltage and then converting the second DC supply voltage into the third DC supply voltage, and
   said switching controller generates the control signal for controlling said switch to supply the second DC supply voltage to said input voltage terminal of said second DC voltage converter, when the first estimated voltage conversion efficiency for supplying a load current of said second DC voltage converter is higher, by a predetermined value or more, than the second estimated voltage conversion efficiency for supplying the load current of said second DC voltage converter.

5. An electronic apparatus according to claim 3, wherein said switching controller detects operational states of one or more particular components of said electronic apparatus receiving the third DC supply voltage of said second DC voltage converter, and then determines, in accordance with an estimated consumed electric current of the particular components corresponding to the operational state of said specific component, a first estimated voltage conversion efficiency of said second DC voltage converter for converting the first DC supply voltage directly into the third DC supply voltage and a second estimated voltage conversion efficiency of said first and second DC voltage converters for converting the first DC supply voltage into the second DC supply voltage and then converting the second DC supply voltage into the third DC supply voltage, and said switching controller generates the control signal for controlling said switch to supply the second DC supply voltage to said input voltage terminal of said second DC voltage converter, when the first estimated voltage conversion efficiency for supplying a load current of said second DC voltage converter is higher, by a predetermined value or more, than the second estimated voltage conversion efficiency for supplying the load current of said second DC voltage converter.

6. An electronic apparatus according to claim 1, wherein the control signal controls said switch to supply the first DC supply voltage to said input voltage terminal of said second DC voltage converter, when an actually detected load current of said second DC voltage converter is larger than a predetermined threshold, and controls said switch to supply the second DC supply voltage to said input voltage terminal of said second DC voltage converter, when the actually detected load current of said second DC voltage converter is smaller than the predetermined threshold.

7. An electronic apparatus according to claim 1, wherein the control signal controls said switch to supply the second DC supply voltage to said input voltage terminal of said second DC voltage converter, when a first voltage conversion efficiency for converting the first DC supply voltage into the second DC supply voltage and then converting the second DC supply voltage into the third DC supply voltage for supplying an actually detected load current of said second DC voltage converter is substantially higher than a second voltage conversion efficiency for converting the first DC supply voltage directly into the third DC supply voltage for supplying the actually detected load current of said second DC voltage converter.

8. A DC voltage conversion circuit comprising:
a DC power source for supplying a first DC supply voltage;
a first DC voltage convener for converting the first DC supply voltage into a second DC supply voltage which is lower than the first DC supply voltage;
a second DC voltage converter for converting either the first DC supply voltage or the second DC supply voltage at an input voltage terminal thereof into a third DC supply voltage which is lower than the second DC supply voltage;
a switch for selecting and supplying one of the first DC supply voltage of said DC power source and the second DC supply voltage of said first DC voltage converter to the input voltage terminal of said second DC voltage converter, in accordance with a control signal; and
a switching controller for providing to said switch said control signal for supplying said first DC supply voltage to said input voltage terminal of said second DC voltage converter when operational states of the components receiving the third DC supply voltage correspond substantially to a high loading state, and for providing to said switch said control signal for supplying said second DC supply voltage to said input voltage terminal of said second DC voltage converter when operational states of the components receiving the third DC supply voltage correspond substantially to a low loading state.

9. A DC conversion circuit according to claim 8, wherein
said DC voltage conversion circuit is mounted on a printed circuit board,
said DC power source has an output terminal at which the first DC supply voltage thereof is developed,
said first DC voltage converter has an output terminal at which the second DC supply voltage thereof is developed,
said switch has input terminals, and
at least one of said output terminals is connected to the corresponding input terminal of said switch via a separate electrically conductive wire.

10. An electronic apparatus operable to receive a first DC supply voltage from a DC power source, the electronic apparatus comprising:
a first DC voltage converter for converting the first DC supply voltage into a second DC supply voltage which is lower than the first DC supply voltage;
a second DC voltage converter for converting either the first DC supply voltage or the second DC supply voltage at an input voltage terminal thereof into a third DC supply voltage which is lower than the second DC supply voltage;
a switch for selecting and supplying one of the first DC supply voltage of said DC power source and the second DC supply voltage of said first DC voltage converter to the input voltage terminal of said second DC voltage converter, in accordance with a control signal;
a switching controller for providing to said switch said control signal for supplying said first DC supply voltage to said input voltage terminal of said second DC voltage converter when operational states of the components receiving the third DC supply voltage correspond substantially to a high loading state, and for providing to said switch said control signal for supplying said second DC supply voltage to said input voltage terminal of said second DC voltage converter when operational states of the components receiving the third DC supply voltage correspond substantially to a low loading state; and
a plurality of components, ones of said components receiving the second DC supply voltage, ones of said components receiving the third DC supply voltage.

* * * * *